US011831762B1

United States Patent
Ippatapu et al.

(10) Patent No.: US 11,831,762 B1
(45) Date of Patent: Nov. 28, 2023

(54) PRE-GENERATING SECURE CHANNEL CREDENTIALS

(71) Applicant: EMC IP Holding Company LLC, Hopkinton, MA (US)

(72) Inventors: Venkata L R Ippatapu, Westborough, MA (US); Kenneth Dorman, West Brookfield, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 8 days.

(21) Appl. No.: 16/886,854

(22) Filed: May 29, 2020

(51) Int. Cl.
*H04L 9/08* (2006.01)
*H04L 67/1097* (2022.01)
*H04L 9/14* (2006.01)
*H04L 9/40* (2022.01)

(52) U.S. Cl.
CPC .......... *H04L 9/0841* (2013.01); *H04L 9/0825* (2013.01); *H04L 9/0861* (2013.01); *H04L 9/14* (2013.01); *H04L 63/045* (2013.01); *H04L 67/1097* (2013.01)

(58) Field of Classification Search
CPC ... H04L 9/0841; H04L 9/0825; H04L 9/0861; H04L 9/14; H04L 63/045; H04L 67/1097
USPC ....................................................... 713/171
See application file for complete search history.

(56) References Cited

U.S. PATENT DOCUMENTS

| | | | |
|---|---|---|---|
| 8,681,993 B2 * | 3/2014 | Struik | H04W 12/04 380/278 |
| 10,129,260 B1 * | 11/2018 | Statica | H04L 63/101 |
| 10,491,576 B1 * | 11/2019 | Pfannenschmidt | H04L 9/14 |
| 2006/0159269 A1 * | 7/2006 | Braun | H04L 9/321 380/277 |
| 2007/0076889 A1 * | 4/2007 | DeRobertis | H04L 9/083 380/279 |
| 2019/0081796 A1 * | 3/2019 | Chow | H04L 9/30 |
| 2019/0312878 A1 * | 10/2019 | Brown | H04L 63/0823 |
| 2021/0194855 A1 * | 6/2021 | Radke | H04L 63/0428 |
| 2021/0218560 A1 * | 7/2021 | Nix | H04L 9/3066 |

* cited by examiner

*Primary Examiner* — Moeen Khan
(74) *Attorney, Agent, or Firm* — Muirhead and Saturnelli, LLC

(57) ABSTRACT

Secure credentials (e.g., Diffie Helman (DH) key pairs) may be generated independently of requests to establish communication channels between storage system ports (SSPs) and remote ports, such that secure credentials are pre-generated relative to the requests for which they are utilized to establish secure communication channels. For example, DH key pairs may be pre-generated, and each DH key pair stored in an entry of a DH key table. The number of DH keys to generate and store may be determined based on user input and/or the number of potential communication channels for the storage system. In response to a request to establish a communication channel, an IKE session may be executed, during which a pre-generated DH key pair may be obtained from the DH key table, from which symmetric for secure communication between the SSP and the remote port may be derived.

16 Claims, 6 Drawing Sheets

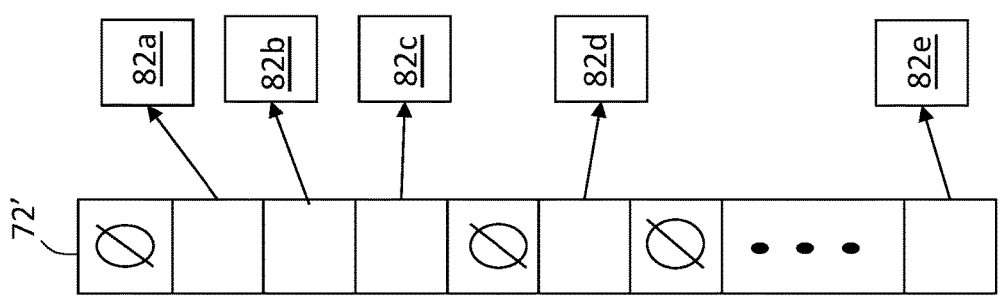

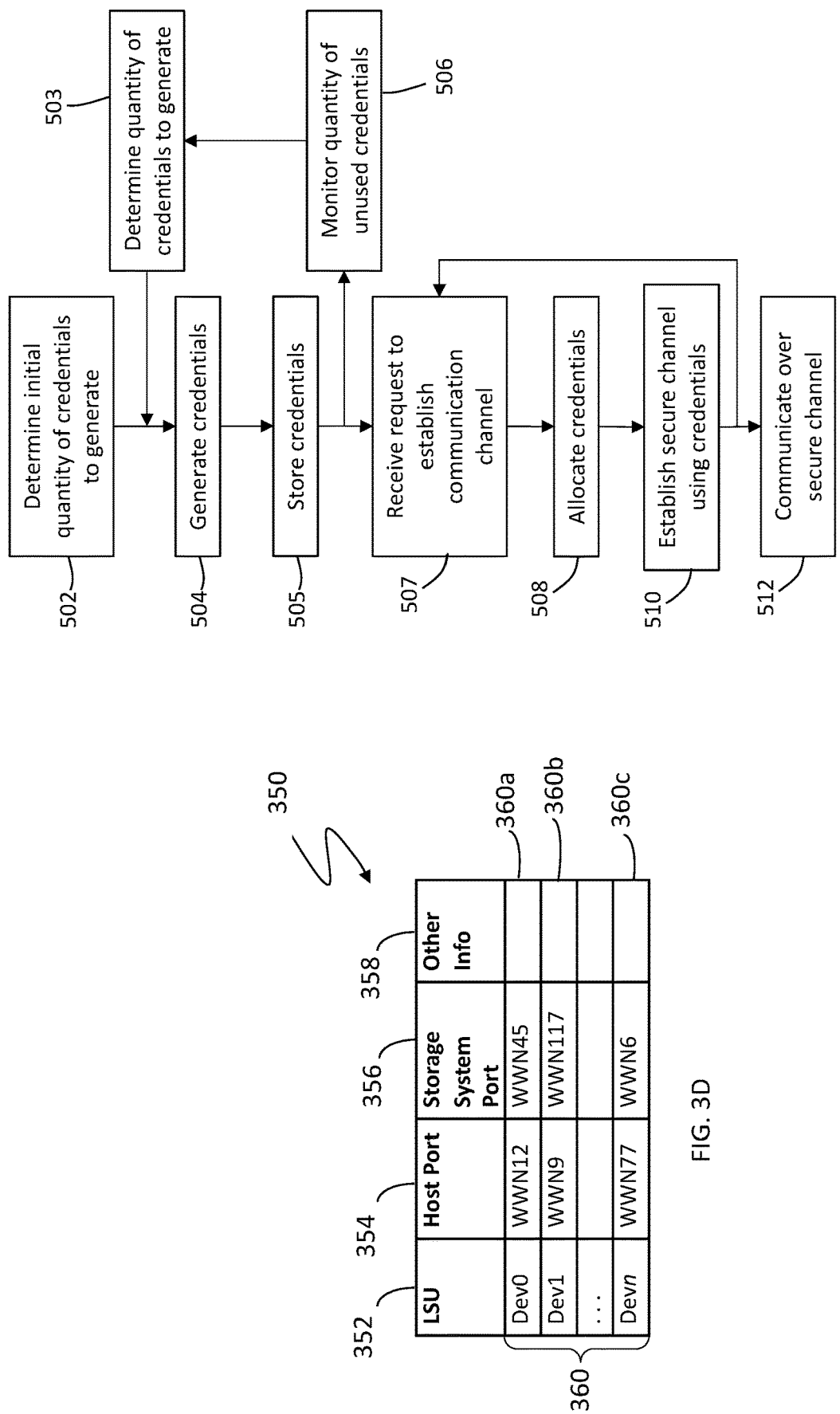

PRE-GENERATING SECURE CHANNEL CREDENTIALS

BACKGROUND

Technical Field

This application generally relates to data storage systems, and more particularly to using secure channel credentials on a data storage system.

Description of Related Art

Data storage systems (often referred to herein simply as "storage systems") may include storage resources used by one or more host systems (sometimes referred to herein as "hosts"), i.e., servers, to store data. One or more storage systems and one or more host systems may be interconnected by one or more network components, for example, as part of a switching fabric, to form a data storage network (often referred to herein simply as "storage network"). Storage systems may provide any of a variety of data services to host systems of the storage network.

A host system may have host applications that utilize the data services provided by one or more storage systems of the storage network to store data on the physical storage devices (e.g., tape, disks or solid state devices) thereof. For a given application, to perform input/output (TO) operations utilizing a physical storage device of the storage system, one or more components of the host system, storage system and network components therebetween may be used.

Host systems may not address the physical storage devices of a storage systems directly, but rather access to data may be provided to one or more host systems from what the host systems view as a plurality of logical storage units (LSUs) including, for example, logical blocks, logical devices (also referred to as logical volumes, LUNs and logical disks), thin devices, groups of logical devices (e.g., storage groups), NVMe namespaces, and other types of LSUs. LSUs are described in more detail elsewhere herein.

SUMMARY OF THE INVENTION

In an embodiment of the invention, a method is performed for a storage system coupled to another system by one or more communication media. The method includes receiving a request to establish a communication channel between the storage system and the other system, obtaining first secure credentials that were generated prior to the request being received, and applying the first secure credentials to establish a secure communication channel between the storage system and the other credentials. The first secure credentials may be a pair of asymmetric keys in accordance with a public cryptography protocol. Establishing the secure communication channel may include generating a pair of symmetric keys from the first secure credentials, and the method further may include the storage system securely exchanging communications with the other system using the symmetric keys. The method further may include generating a plurality of secure credentials for the storage system independent of establishing communication channels with other systems, including generating the first secure credentials. The storage system may have a plurality of first ports and is connected by the one or more communication media to a plurality of second ports of one or more other systems, and wherein the method further may include determining a quantity of the plurality of secure credentials to generate based on a quantity of the first ports and a quantity of the second ports. The method further may include maintaining a list of the plurality of secure credentials, where the first secure credentials are obtained from the list. The method further may include generating additional secure credentials to replenish used security credentials and/or in response to additional systems being coupled to the storage system.

In another embodiment of the invention a storage system is coupled to another system by one or more communication media. The storage system includes executable logic that implements a method including receiving a request to establish a communication channel between the storage system and the other system, obtaining first secure credentials that were generated prior to the request being received, and applying the first secure credentials to establish a secure communication channel between the storage system and the other credentials. The first secure credentials may be a pair of asymmetric keys in accordance with a public cryptography protocol. Establishing the secure communication channel may include generating a pair of symmetric keys from the first secure credentials, and the method further may include the storage system securely exchanging communications with the other system using the symmetric keys. The method further may include generating a plurality of secure credentials for the storage system independent of establishing communication channels with other systems, including generating the first secure credentials. The storage system may have a plurality of first ports and be connected by the one or more communication media to a plurality of second ports of one or more other systems, and the method further may include determining a quantity of the plurality of secure credentials to generate based on a quantity of the first ports and a quantity of the second ports. The method further may include maintaining a list of the plurality of secure credentials, where the first secure credentials are obtained from the list. The method further may include generating additional secure credentials to replenish used security credentials and/or in response to additional systems being coupled to the storage system.

In another embodiment of the invention, computer-readable media may be provided for a storage system coupled to another system by one or more communication media. The computer-readable media has software stored thereon including executable code that receives a request to establish a communication channel between the storage system and the other system, executable code that obtains first secure credentials that were generated prior to the request being received, and executable code that applies the first secure credentials to establish a secure communication channel between the storage system and the other credentials. The first secure credentials are a pair of asymmetric keys in accordance with a public cryptography protocol. The computer-readable media of claim 15, wherein establishing the secure communication channel may include generating a pair of symmetric keys from the first secure credentials, and the software further may include executable code that controls the storage system to securely exchange communications with the other system using the symmetric keys. The software further may include executable code that generates a plurality of secure credentials for the storage system independent of establishing communication channels with other systems, including generating the first secure credentials. The storage system may have a plurality of first ports and be connected by the one or more communication media to a plurality of second ports of one or more other systems, and the software further may include executable code that determines a quantity of the plurality of secure credentials to generate based on a quantity of the first ports and a quantity of the second ports. The software further may include executable code that maintains a list of the plurality of secure credentials, where the first secure credentials are obtained from the list.

BRIEF DESCRIPTION OF THE DRAWINGS

Features and advantages of the present invention will become more apparent from the following detailed description of illustrative embodiments thereof taken in conjunction with the accompanying drawings in which:

FIG. 3B a block diagram illustrating an example of a table used for a thin logical device, according to embodiments of the invention;

FIG. 3C is a block diagram illustrating an example of a data structure for mapping logical storage unit tracks to cache slots, according to embodiments of the invention;

FIG. 3D is a block diagram illustrating an example of a data structure defining port connectivity permissions between a storage system and one or more host systems, according to embodiments of the invention;

FIG. 5 is a flowchart illustrating a method of pre-generating security credentials before initiating establishment of a secure communication channel, according to embodiments of the invention.

DETAILED DESCRIPTION OF EMBODIMENTS

Figure 1:
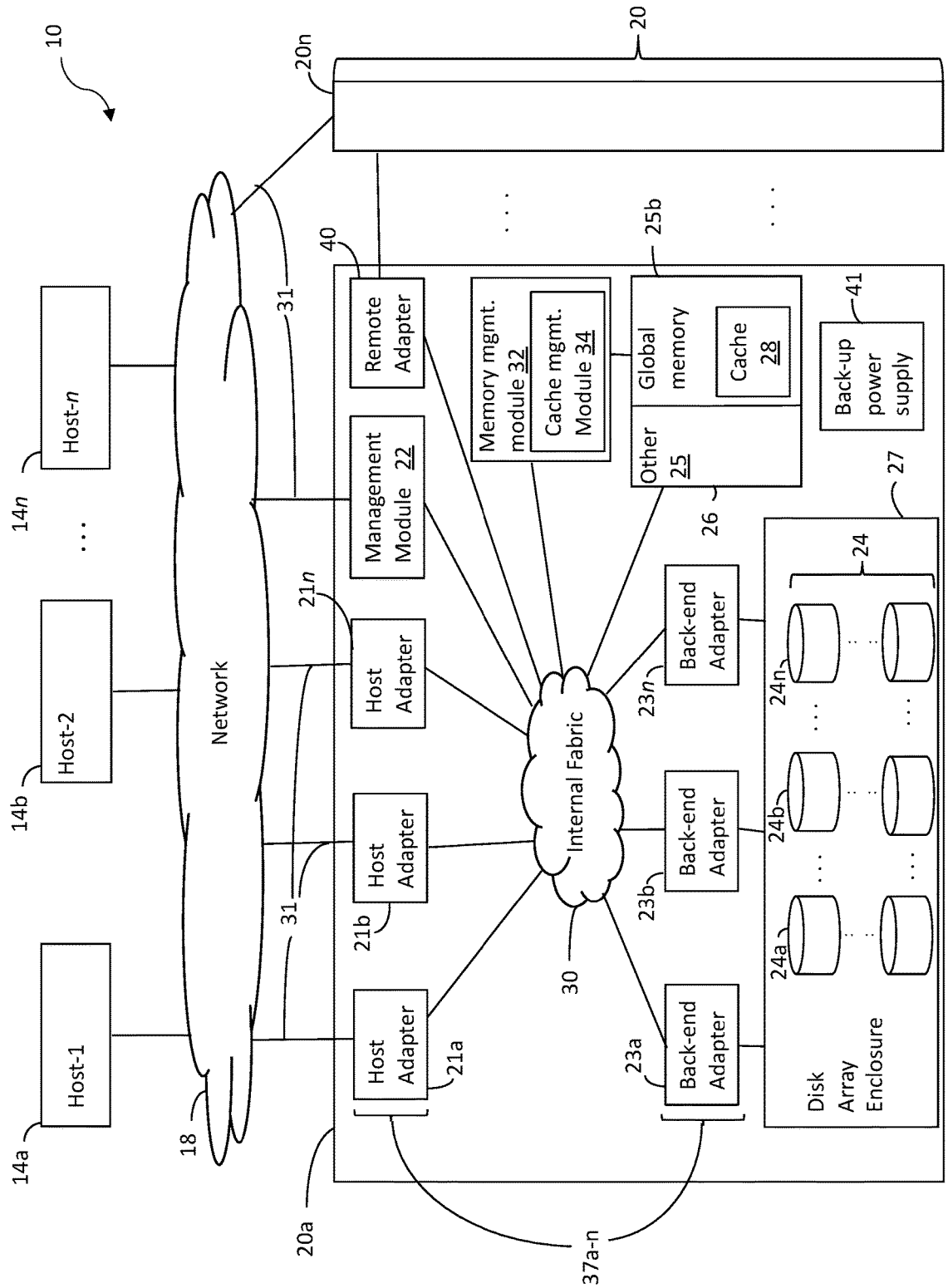
FIG. 1 is a block diagram illustrating an example of a data storage network, according to embodiments of the invention.

In response to a request to create a communication channel between a port of a storage system and a port of a host, another storage system or another device ("remote port"), a secure communication channel may be established between the storage system port and the remote port. Establishing a secure communication channel between a storage system port (SSP) and a remote port may involve implementing an Internet Key Exchange (IKE) session in accordance with an IKE protocol of the IPsec protocol suite to generate symmetric keys between the SSP and the remote port to securely exchange communications. For example, the symmetric keys may be programmed into the hardware of the SSP, and the SSP may use the symmetric keys to perform inline Encryption Data in Flight (EDiF) for communications with remote ports, for example, in accordance with one or more known standards.

The IKE session includes generating Diffie Helman (DH) keys pairs, from which the symmetric keys are derived. The DH protocol is a public-key protocol, which includes creating a pair of keys: the private key, which should be kept as a secret by the owning entity/proprietor; and the public key, which can be shared publicly with other entities. The DH protocol is often used to derive other cryptographic keys, e.g., symmetric keys, on each remote end securely over an open (i.e., public) communication channel, for example, as part of an IKE session. Generating a pair of DH keys (e.g., in software using cryptographic operations defined by an OpenSSL toolkit) may be computationally expensive, consuming several CPU cycles, and taking up to hundreds of milliseconds or even longer to perform—i.e., for each request to create a communication channel.

High-end storage systems, for example, PowerMax systems made available from EMC Corporation of Hopkinton, Mass. (Dell EMC) may have multiple thousands of active communication channels with host systems at any given time, in addition to remote connections with other storage systems. In the event that many requests to establish communication channels are received in a relatively short period of time (e.g., as part of a burst of such requests), such requests may be queued while secure communication channels are established for earlier (or priority) requests, which includes processing IKE sessions as described above. For a given request to create a communication channel, the total latency in establishing a secure communication channel may be defined by Equation 1:

$$L_T = Q(t) + DH(t) + IKE(t)$$ Equation 1:

where $L_T$ is the total latency, Q(t) is the latency associated with (i.e., the time spent) waiting in a queue to establish secure communications, DH(t) is the latency associated with (i.e., the time spent) generating the DH key pair and IKE(t) is the latency associated with (i.e., the time spent) processing the remainder of the IKE session (i.e., excluding generating the DH key).

In some cases, the latency associated with generating the DH key pair (DH(t) in Equation 1) may be up to 50% or even higher of the total latency, $L_T$, for establishing a secure communication channel. Depending on the size of a burst of requests to establish communication channels, and the limits to which the storage system can execute IKE sessions (including generate DH keys) for queued entries in parallel, the latency associated with establishing secure communication channels may significantly impact performance of a storage system, perhaps leading to unacceptable levels of performance degradation.

What may be desirable is a way to reduce the amount of latency caused by generating DH private keys when establishing a secure communication channel.

Described herein are techniques and mechanisms for reducing the amount of latency caused by generating DH private keys, or other types of secure credentials, when establishing a secure communication channel, which may improve system performance. In some embodiments, secure credentials (e.g., DH key pairs) are generated independently of requests to establish communication channels such that secure credentials are pre-generated relative to the requests for which they are utilized to establish secure communication channels. Such pre-generated secure credentials may be stored in a data structure (e.g., a table), and later accessed in response to requests to create communication channels between SSPs and remote ports, and used to establishing secure communication channels between the SSPs and remote ports.

For example, DH key pairs may be pre-generated, and each DH key pair stored in an entry of a DH key table. The number of DH keys to generate and store may be determined based on user input and/or the number of potential communication channels for the storage system, as described in more detail elsewhere herein. In response to a request to establish a communication channel, an IKE session may be executed, during which a pre-generated DH key pair may be obtained from the DH key table, from which symmetric keys between the SSP and remote port may be derived. By obtaining the pre-generated DH key pair rather than generating a DH key pair in response to the request, the latency associated with generating a DH key (DH(t) $L_T$ in Equation 1) may be removed and replaced with the time it takes to retrieve a DH key pair from the DH key table, which may be orders of magnitude less, thereby reducing the total latency ($L_T$ in Equation 1) in establishing a secure communication channel, perhaps significantly. It should be appreciated that the reduced latency for each such request may lead to a reduction or perhaps elimination of a queue of such requests, further reducing the latency associated with establishing a secure communication channel.

After being allocated to an IKE session, a DH key pair may be removed from the DH Key table or marked as used. The DH key table may be monitored (e.g., via a background process) and additional DH key pairs generated to keep pace with actual or anticipated demand for establishing secure communication channels.

It should be appreciated that although embodiments described herein are described in relation to SSPs, the invention is not so limited and covers in scope communications between any two devices that involves generating secure credentials. Further, while embodiments described herein are described in relation to DH keys, the invention is not so limited, but may be applied to pre-generate other types of security credentials for later use in establishing secure communication channels, for example, other types of asymmetric or symmetric key pairs.

Illustrative embodiments of the invention will now be described in more detail in relation to the figures.

FIG. 1 illustrates an example of an embodiment of a data storage network 10 (often referred to herein as a "storage network"). The storage network 10 may include any of: host systems (i.e., "hosts") 14a-n; network 18; one or more storage systems 20a-n; other components; or any suitable combination of the foregoing. Storage systems 20a-n, connected to host systems 14a-n through network 18, may collectively constitute a distributed storage system 20. All of the host computers 14a-n and storage systems 20a-n may be located at the same physical site, or, alternatively, two or more host computers 14a-n and/or storage systems 20a-n may be located at different physical locations. Storage network 10 or portions thereof (e.g., one or more storage systems 20a-n in combination with network 18) may be any of a variety of types of storage networks, such as, for example, a storage area network (SAN), e.g., of a data center. Embodiments of the invention are described herein in reference to storage system 20a, but it should be appreciated that such embodiments may be implemented using other discrete storage systems (e.g., storage system 20n), alone or in combination with storage system 20a.

The N hosts 14a-n may access the storage system 20a, for example, in performing input/output (IO) operations or data requests, through network 18. For example, each of hosts 14a-n may include one or more host bus adapters (HBAs) (not shown) that each include one or more host ports for connecting to network 18. The network 18 may include any one or more of a variety of communication media, switches and other components known to those skilled in the art, including, for example: a repeater, a multiplexer or even a satellite. Each communication medium may be any of a variety of communication media including, but not limited to: a bus, an optical fiber, a wire and/or other type of data link, known in the art. The network 18 may include at least a portion of the Internet, or a proprietary intranet, and components of the network 18 or components connected thereto may be configured to communicate in accordance with any of a plurality of technologies, including, for example: SCSI, ESCON, Fibre Channel (FC), iSCSI, FCoE, GIGE (Gigabit Ethernet), NVMe over Fabric (NVMeoF); other technologies, or any suitable combinations of the foregoing, each of which may have one or more associated standard specifications. In some embodiments, the network 18 may be, or include, a storage network fabric including one or more switches and other components. A network located externally to a storage system that connects host systems to storage system resources of the storage system, may be referred to herein as an "external network."

Each of the host systems 14a-n and the storage systems 20a-n included in the storage network 10 may be connected to the network 18 by any one of a variety of connections as may be provided and supported in accordance with the type of network 18. The processors included in the host computer systems 14a-n may be any one of a variety of proprietary or commercially available single or multi-processor system, such as an Intel-based processor, or other type of commercially available processor able to support traffic in accordance with each particular embodiment and application. Each of the host computer systems may perform different types of operations in accordance with different tasks and applications executing on the hosts. In the embodiment of FIG. 1, any one of the host computers 14a-n may issue an IO request to the storage system 20a to perform an IO operation. For example, an application executing on one of the host computers 14a-n may perform a read or write operation resulting in one or more IO requests being transmitted to the storage system 20a.

Each of the storage systems 20a-n may be manufactured by different vendors and interconnected (not shown). Additionally, the storage systems 20a-n also may be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of IO requests as may be issued by each of the host computer systems 14a-n, for example, to the storage systems 20a-20n. It should be appreciated that the particulars of the hardware and software included in each of the components that may be included in the storage systems 20a-n are described herein in more detail, and may vary with each particular embodiment.

Each of the storage systems, such as 20a, may include a plurality of physical storage devices 24 (e.g., physical non-volatile storage devices) such as, for example, disk devices, solid-state storage devices (SSDs, e.g., flash, storage class memory (SCM), NVMe SSD, NVMe SCM) or even magnetic tape, and may be enclosed within a disk array enclosure (DAE) 27. In some embodiments, two or more of the physical storage devices 24 may be grouped or arranged together, for example, in an arrangement consisting of N rows of physical storage devices 24a-n. In some embodiments, one or more physical storage devices (e.g., one of the rows 24a-n of physical storage devices) may be connected to a back-end adapter ("BE") (e.g., a director configured to serve as a BE) responsible for the backend management of operations to and from a portion of the physical storage devices 24. A BE is sometimes referred to by those in the art as a disk adapter ("DA") because of the development of such adapters during a period in which disks were the dominant type of physical storage device used in storage systems, even though such so-called DAs may be configured to manage other types of physical storage devices (e.g., SSDs). In the system 20a, a single BE, such as 23a, may be responsible for the management of one or more (e.g., a row) of physical storage devices, such as row 24a. That is, in some configurations, all IO communications with one or more physical storage devices 24 may be controlled by a specific BE. BEs 23a-n may employ one or more technologies in communicating with, and transferring data to/from, physical storage devices 24, for example, SAS, SATA or NVMe. For NVMe, to enable communication between each BE and the physical storage devices that it controls, the storage system may include a PCIe switch for each physical storage device controlled by the BE; i.e., connecting the physical storage device to the controlling BE.

It should be appreciated that the physical storage devices are not limited to being arranged in rows. Further, the DAE 27 is not limited to enclosing disks, as the name may suggest, but may be constructed and arranged to enclose a plurality of any type of physical storage device, including any of those described herein, or combinations thereof.

The system 20a also may include one or more host adapters ("HAs") 21a-n, which also are referred to herein as front-end adapters ("FAs") (e.g., directors configured to serve as FAs). Each of these FAs may be used to manage communications and data operations between one or more host systems and GM 25b of memory 26. The FA may be, or include, a Fibre Channel (FC) adapter if FC is a technology being used to communicate between the storage system 20a and the one or more host systems 14a-n, or may be another type of adapter based on the one or more technologies being used for IO communications.

Also shown in the storage system 20a is a remote adapter ("RA") 40. The RA may be, or include, hardware that includes a processor used to facilitate communication between storage systems (e.g., 20a and 20n), such as between two of the same or different types of storage systems, and/or may be implemented using a director.

Storage system 20a also may include a management module 22, which may be configured (e.g., dedicated) to performing storage management functions or services such as, for example, storage provisioning, device configuration, tier management, other services, or any combination of other services. The management module may be configured to be accessed by only certain personnel (e.g., storage administrators, support engineers) and may have its own dedicated hardware, firmware, software, CPU resources and OS, and may be loaded with one or more applications, tools, CLIs, APIs and the like to enable management. In some embodiments, the management module, or portions thereof, may be located external to storage system 20a, for example, as part of one of host systems 14a-n or another separate system connected to storage system 20a via network 18.

The FAs, BEs and RA may be collectively referred to herein as directors 37a-n. Each director 37a-n may be implemented (e.g., in hardware, firmware, software or a combination thereof) on a circuit board that includes memory resources (e.g., at least a segment of GM portion 25b) and compute resources, for example, one or more processing cores (e.g., as part of a CPU) and/or a CPU complex for processing IO operations, and that as described in more detail elsewhere herein. There may be any number of directors 37a-n, which may be limited based on any of a number of factors, including spatial, computation and storage limitations. In an embodiment disclosed herein, there may be up to sixteen directors coupled to the memory 26. Other embodiments may use a higher or lower maximum number of directors.

System 20a also may include an internal switching fabric (i.e., internal fabric) 30, which may include one or more switches, that enables internal communications between components of the storage system 20a, for example, directors 37a-n (FAs 21a-n, BEs 23a-n, RA 40, management module 22) and memory 26, e.g., to perform IO operations. One or more internal logical communication paths may exist between the directors and the memory 26, for example, over the internal fabric 30. For example, any of the directors 37a-n may use the internal fabric to communicate with other directors to access any of physical storage devices 24; i.e., without having to use memory 26. In addition, one of the directors 37a-n may be able to broadcast a message to all of the other directors 37a-n over the internal fabric 30 at the same time. Each of the components of system 20a may be configured to communicate over internal fabric 30 in accordance with one or more technologies such as, for example, InfiniBand (IB), Ethernet, Gen-Z, another technology, or any suitable combination of the foregoing.

The GM portion 25b may be used to facilitate data transfers and other communications between the directors 37a-n in a storage system. In one embodiment, the directors 37a-n (e.g., serving as FAs or BEs) may perform data operations using a cache 28 that may be included in the GM 25b, for example, in communications with other directors, and other components of the system 20a. The other portion 25a is that portion of memory that may be used in connection with other designations that may vary in accordance with each embodiment. Global memory 25b and cache 28 are described in more detail elsewhere herein. It should be appreciated that, although memory 26 is illustrated in FIG. 1 as being a single, discrete component of storage system 20a, the invention is not so limited. In some embodiments, memory 26, or the GM 25b or other memory 25a thereof, may be distributed among a plurality of physically discrete processing nodes (e.g., circuit boards) as described in more detail elsewhere herein.

In at least one embodiment, write data received at the storage system from a host or other client may be initially written to cache 28 and marked as write pending. For example, cache 28 may be partitioned into one or more portions called cache slots (which also may be referred to in the field of data storage as cache lines, cache blocks or another name), which may be a of a predefined uniform size, for example, 128 Kbytes. Write data of a write operation received at the storage system may be initially written (i.e., staged) in one or more of these cache slots and marked as write pending. Once written to cache 28, the host (e.g., one of 14a-n) may be notified that the write operation has completed. At a later time, the write data may be de-staged from cache 28 to one or more physical storage devices 24a-n, such as by a BE.

The memory 26 may include persistent memory for which for which data stored thereon persists after the process or program that created the data terminates. For example, at least portions of the memory 26 may be implemented using DIMM (or another type of fast RAM memory) that is battery-backed by a NAND-type memory (e.g., flash). In some embodiments, the data in such persistent memory may persist (for at least some period of time) after the storage system fails. The memory 26 (or at least a portion thereof— e.g., the cache 28 or a portion thereof) may be configured such that each data written to the memory 28 is mirrored to provide a form of write protection. For example, each memory location within each such mirrored portion of the memory 26 may have a corresponding memory location on the storage system 20a to which a redundant copy of the data is stored, and which can be used in place of the mirrored memory location in the event the mirrored memory location fails. The redundant memory location should be located outside of at least the most local fault zone of the mirrored memory location. In some embodiments described in more detail herein, the memory 26 may be distributed among multiple physically discrete processing nodes (e.g., circuit boards), in which case mirroring may be configured such that a mirrored memory location and its corresponding redundant memory location are located on different physically discrete processing nodes.

Storage system 20a may include a back-up power supply 41 (e.g., a battery) that can provide power to the storage system for a limited amount of time to after primary (AC) power fails. This limited time may allow certain tasks to be performed during a window of time beginning when the primary power fails until the earliest of: the primary power is restored; and the end of the limited lifetime (sometimes on the order of second or tens of seconds) of the back-up power supply. For example, the storage system 20a (e.g., the memory 26 and/or memory management module 32) may be configured to automatically copy the contents of the memory 26 during this window of time to one or more predetermined physical storage devices, to be restored to the memory 26 after the power has been restored, e.g., as part of the storage system recovering process. Such automatic copying for restoration during recovering may referred to herein as "vaulting." Vaulting may provide a form of write protection for data written to the memory 26, for example, for dirty data in the cache 28; i.e., data written to the storage system, which has been staged in the cache 28 but not yet de-staged to a physical storage device. More broadly, vaulting may be performed for any data written to the memory 26.

The storage system 20a may include a memory management module 32 configured to manage one or more aspects of the memory 26, and the memory management module 32 may include a cache management module 34 for managing one or more aspects of the cache 28.

It should be noted that, although examples of techniques herein may be made with respect to a physical storage system and its physical components (e.g., physical hardware for each RA, BE, FA and the like), techniques herein may be performed in a physical storage system including one or more emulated or virtualized components (e.g., emulated or virtualized ports, emulated or virtualized BEs or FAs), and also a virtualized or emulated storage system including virtualized or emulated components. For example, in embodiments in which NVMe technology is used to communicate with, and transfer data between, a host system and one or more FAs, one or more of the FAs may be implemented using NVMe technology as an emulation of an FC adapter.

Figure 2:
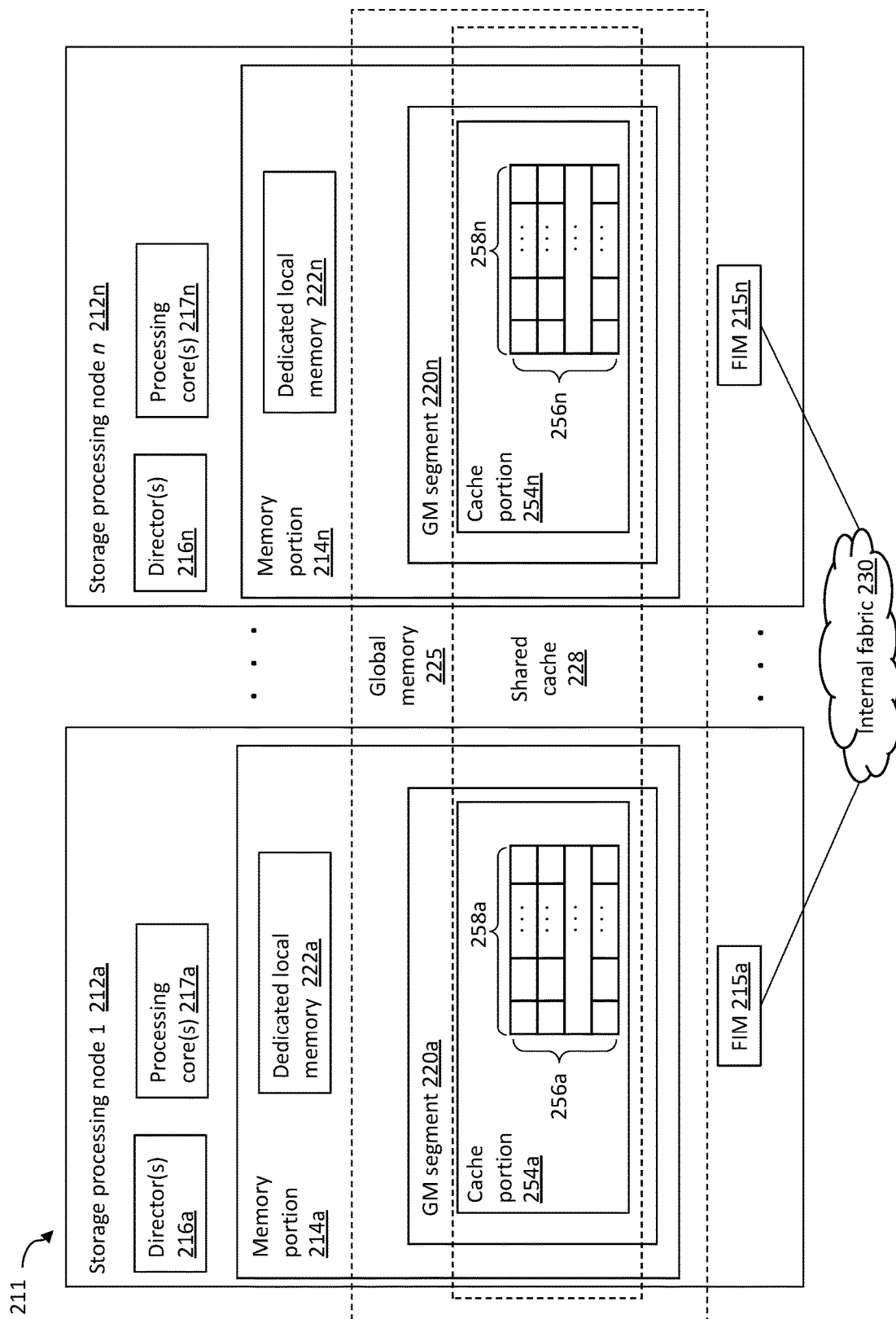
FIG. 2 is a block diagram illustrating an example of a storage system including multiple physically discrete storage processing nodes, according to embodiments of the invention.

Any of storage systems 20a-n, or one or more components thereof, described in relation to FIGS. 1-2 may be implemented using one or more Symmetrix™, VMAX™, VIVIAX3™ or PowerMax™ systems made available from Dell EMC.

Host systems 14a-n may provide data and control (e.g., management and access control) information to storage systems 20a-n over a plurality of IO paths defined between the host systems and storage systems, for example, including host system components, storage system components, and network components (e.g., of network 18), and the storage systems also may provide data to the host systems across the IO paths. In the embodiment of FIG. 1, the host systems may not address the physical storage devices (e.g., disk drives or flash drives) 24 of the storage systems directly, but rather access to data may be provided to one or more host systems from what the host systems view as a plurality of LSUs including, for example, logical blocks, logical devices (also referred to as logical volumes, LUNs, logical storage units and/or logical disks), thin devices, groups of logical devices (e.g., storage groups), NVMe namespaces, and other types of LSUs. For example, a PowerMax storage system may be configured to organize available storage resources (e.g., physical storage devices) into many LUNs, each with its own addressable space defined in logical blocks addresses (LBAs). The LSUs may or may not correspond to the actual physical storage devices. For example, one or more LSUs may map to a single physical storage device; that is, the logical address space of the one or more LSU may map to physical space on a single physical storage device. Data in a single storage system may be accessed by multiple hosts allowing the hosts to share the data residing therein. The FAs may be used in connection with communications between a storage system and a host system. The RAs may be used in facilitating communications between two storage systems. The BEs may be used in connection with facilitating communications to the associated physical storage device(s) based on LSU(s) mapped thereto.

FIG. 2 is a block diagram illustrating an example of at least a portion 211 of a storage system (e.g., 20a) including multiple, physically discrete storage processing nodes (e.g., circuit boards) 212a-212n, which may be referred to herein as "processing nodes." Storage system 211 may include a plurality of processing nodes 212a-212n and a fabric 230 (e.g., internal fabric 30) over which the processing nodes 212a-n may communicate. Each of the processing nodes 212a-212n may include components thereon as illustrated. The fabric 230 may include, for example, one or more switches and connections between the switch(es) and processing nodes 212a-212n. In at least one embodiment, the fabric 230 may be an IB fabric. In some embodiments, multiple processing 212a-n nodes may be implemented on a single physically discrete component; e.g., two processing nodes 212a-n may be implemented on single engine of PowerMax storage system.

In the following paragraphs, further details are described with reference to processing node 212a but each of the N processing nodes in a system may be similarly configured. For example, processing node 212a may include any of: one or more directors 216a (e.g., directors 37a-n); memory portion 214a; one or more processing cores 217a including compute resources, for example, as part of a CPUs and/or a CPU complex for processing IO operations; and a fabric interface module (FIM) 215a for interfacing the processing node 212a to an internal fabric 230. Each director 216a may be configured to operate, such as by executing code, as any one or more of an FA, BE, RA, and the like. In some embodiments, each of the directors, or a portion thereof, are implemented in software stored in a memory portion 214a (e.g., in a dedicated local memory 222a) that is executed by one or more of the processing cores 217a. Such software implementation of directors may be considered emulations of types of physical directors (i.e., directors implemented (at least primarily) in hardware).

Each FIM 215a-n may include one or more host channel adapters (HCAs) that physically couple, and are configured to enable communication between, its respective processing node 212a-n, and the internal fabric 230. In some embodiments, the internal fabric 230 may include multiple (e.g., 2)

switches, and each HCA 215a-n may have multiple (e.g., 2) ports, each one connected directly to one of the switches.

Each of the processing nodes 212a-n may, respectively, also include memory portions 214a-n. The memory portion of each processing node may be characterized as locally accessible with respect to that particular processing node, and more specifically with respect to other components on the same processing node. For example, processing node 212a includes memory portion 214a which is memory that is local to that particular processing node 212a. Data stored in memory portion 214a may be directly accessed by any of the processing cores 217a (e.g., executing instructions on behalf of one of the directors 216a) of the processing node 212a. For example, memory portion 214a may be a fast memory (e.g., DIMM (dual inline memory module) DRAM (dynamic random access memory)) that is locally accessible by a director 216a, where data from one location in 214a may be copied to another location in 214a directly using DMA operations (e.g., local memory copy operations) issued by director 216a. Thus, the director 216a may directly access data of 214a locally without communicating over the fabric 230.

The memory portions 214a-214n of processing nodes 212a-n may be further partitioned into different portions or segments for different uses. For example, each of the memory portions 214a-214n may respectively include GM segments 220a-n configured for collective use as segments of a distributed GM, for example, GM 225 (e.g., GM 25b). Thus, data stored in any GM segment 220a-n may be accessed by any director 216a-n on any processing node 212a-n. Additionally, each of the memory portions 214a-n may respectively include dedicated local memories 222a-n. Each of the dedicated local memories 222a-n are respectively configured for use locally by the one or more directors 216a-n, and possibly other components, residing on the same single processing node. In at least one embodiment where there is a single director denoted by 216a (and generally by each of 216a-n), data stored in the dedicated local memory 222a may be accessed by the respective single director 216a located on the same processing node 212a. However, the remaining directors located on other ones of the N processing nodes may not access data stored in the dedicated local memory 222a.

To further illustrate, GM segment 220a may include information such as user data stored in the cache portion 220a, metadata, and the like, that is accessed (e.g., for read and/or write) generally by any director of any of the processing nodes 212a-n. Thus, for example, any director 216a-n of any of the processing nodes 212a-n may communicate over the fabric 230 to access data in GM segment 220a. In a similar manner, any director 216a-n of any of the processing nodes 212a-n may generally communicate over fabric 230 to access any GM segment 220a-n of the distributed GM. Although a particular GM segment, such as 220a, may be locally accessible to directors on one particular processing node, such as 212a, any director of any of the processing nodes 212a-n may generally access the GM segment 220a. Additionally, the director 216a also may use the fabric 230 for data transfers to and/or from GM segment 220a even though 220a is locally accessible to director 216a (without having to use the fabric 230).

Also, to further illustrate, dedicated local memory 222a may be a segment of the memory portion 214a on processing node 212a configured for local use solely by components on the single/same processing node 212a. For example, dedicated local memory 222a may include data described in following paragraphs which is used and accessed only by directors 216a included on the same processing node 212a as the dedicated local memory 222a. In at least one embodiment in accordance with techniques herein and as described elsewhere herein, each of the dedicated local memories 222a-n may include a local page table or page directory used, respectively, by only director(s) 216a-n local to each of the processing nodes 212a-n.

In such an embodiment as in FIG. 2, the GM segments 220a-n may be logically concatenated or viewed in the aggregate as forming one contiguous GM logical address space of a distributed GM. In at least one embodiment, the distributed GM formed by GM segments 220a-n may include the cache portion 254a, various metadata and/or structures, and other information, as described in more detail elsewhere herein. Consistent with discussion herein, the cache portion 254a, having cache slots allocated from GM segments 220a-n, may be used to store 10 data (e.g., for servicing read and write operations).

Each cache portion 254a-n may be a portion of a shared cache 228 (e.g., cache 28) distributed across the processing nodes 212a-n, where the shared cache 228 may be considered a part of the GM 225. The cache portion 254a-n may include a plurality of cache slots 256a-n, each cache slot including one or more (e.g., 16) sections 258a-n. Each cache slot 256a-n may be of a uniform size (e.g., 128 KB) and each section may be of a uniform size (e.g., 8 KB). It should be appreciated that cache slot sizes and section sizes other than 128 KB and 8 KB, and a quantity of sections other than 16, may be used.

In an embodiment, the storage system as described may be characterized as having one or more logical mapping layers in which an LSU of the storage system is exposed to the host whereby the LSU is mapped by such mapping layers of the storage system to one or more physical storage devices. Additionally, the host also may have one or more additional mapping layers so that, for example, a host-side LSU may be mapped to one or more storage system LSUs as presented to the host.

Any of a variety of data structures may be used to process 10 on storage system 20a, including data structures to manage the mapping of LSUs and locations thereon to physical storage devices and locations thereon. Such data structures may be stored in any of memory 26, including GM 25b and memory 25a, GM segment 220a-n and/or dedicated local memories 22a-n. Thus, storage system 20a, and storage system 620a described in more detail elsewhere herein, may include memory elements (e.g., cache) that hold data stored on physical storage devices or that is currently held ("staged") and will be stored ("de-staged") to physical storage devices, and memory elements that store metadata (e.g., any of the metadata described herein) associated with such data. Illustrative examples of data structures for holding such metadata will now be described.

Figure 3A:
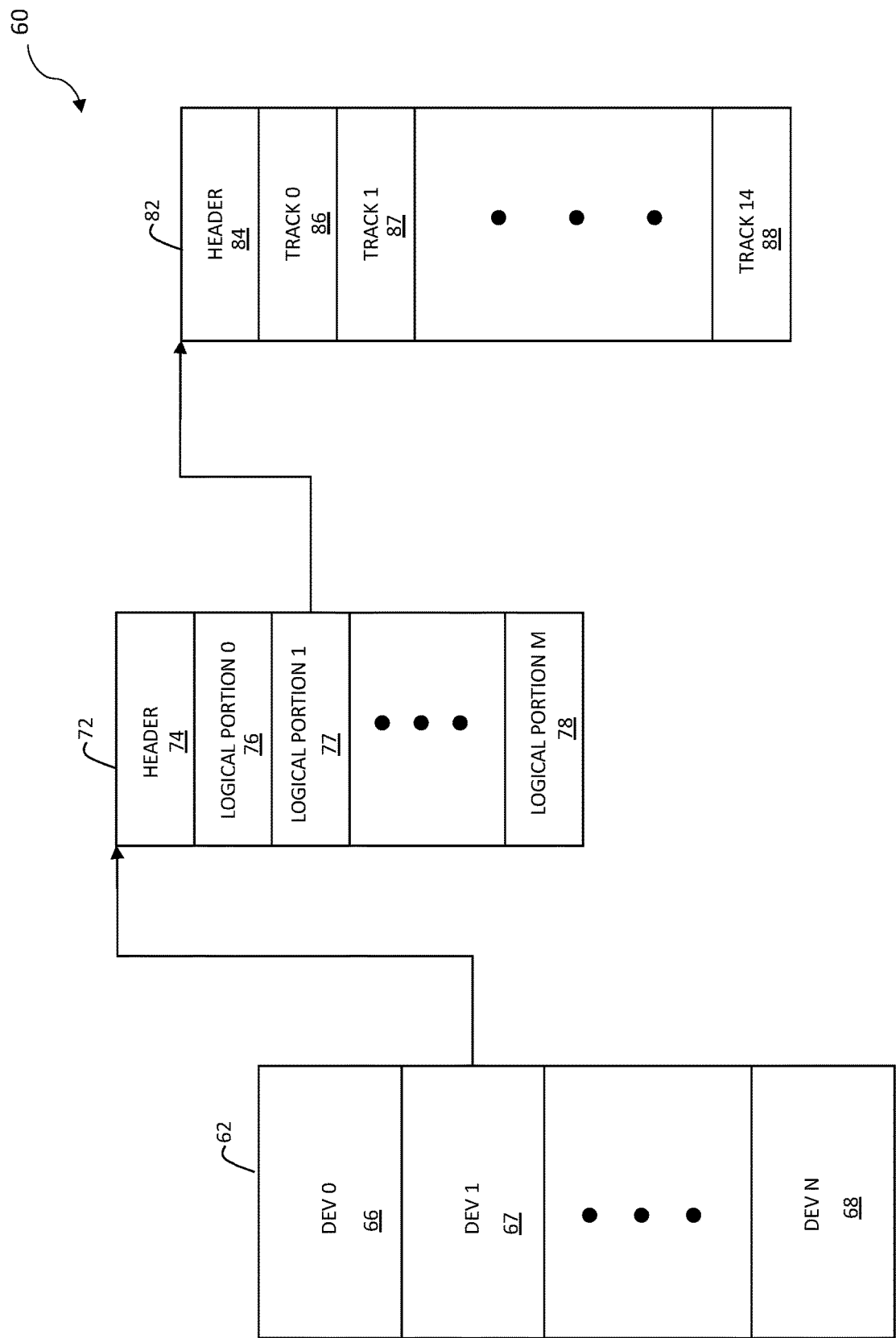
FIG. 3A is a block diagram illustrating an example of tables defining relationships between logical storage units and physical storage devices on a data storage system, according to embodiments of the invention.

FIG. 3A is a block diagram illustrating an example of tables 60 defining relationships between LSUs and physical storage devices on a data storage system, according to embodiments of the invention. A first table 62 corresponds to the LSUs (e.g., logical deices) used by a storage system (e.g., storage system 20a) or by an element of a storage system, such as an FA and/or a BE, and may be referred to herein as a "master LSU table." The master LSU table 62 may include a plurality of LSU entries 66-68, each entry representing an LSU used by the storage system. The entries in the master LSU table 62 may include descriptions for any type of LSU described herein.

Each of the entries 66-68 of the master LSU table 62 may correspond to, and include a reference to, another table corresponding to the LSU represented by the respective entry. For example, the entry 67 may reference a table 72, referred to herein as an "LSU table," corresponding to the LSU represented by the entry 67. The LSU table 72 may include a header that contains information pertinent to the LSU as a whole. The LSU table 72 also may include entries 76-78 for separate contiguous logical data portions of the represented LSU; each such logical data portion corresponding to, and including a reference to, one or more contiguous physical locations (e.g., logical block address ranges) of a physical storage device (e.g., a cylinder and/or a group of tracks). In an embodiment disclosed herein, an LSU may contain any number of logical data portions depending upon how the LSU is initialized. However, in other embodiments, an LSU may contain a fixed number of logical data portions.

Each of the logical data portion entries 76-78 may correspond to a track table. For example, the entry 77 may correspond to a track table (or "LSU track table") 82, which includes a header 84. The LSU track table 82 also includes entries 86-88, each entry representing an LSU track of the entry 77. As used herein, a "track" or "LSU track" represents a contiguous segment of physical storage space on a physical storage device. In an embodiment disclosed herein, there are fifteen tracks for each contiguous logical data portion. However, for other embodiments, it may be possible to have different numbers of tracks for each of the logical data portions or even a variable number of tracks for each logical data portion. The information in each of the LSU track entries 86-88 may include a pointer (either direct or indirect—e.g., through another data structure) to a physical address of a physical storage device, for example, any of physical storage devices 24 of the storage system 20*a* (or a remote storage system if the system is so configured).

In addition to physical storage device addresses, or as an alternative thereto, each of the LSU track entries 86-88 may include a pointer (either direct or indirect—e.g., through another data structure) to one or more cache slots of a cache in the GM if the data of the logical track is currently in cache. For example, an LSU track entry 86-88 may point to one or more entries of cache slot table 300, described in more detail elsewhere herein. Thus, the LSU track table 82 may be used to map logical addresses of an LSU corresponding to the tables 62, 72, 82 to physical addresses within physical storage devices of a storage system and/or to cache slots within a cache.

In some embodiments, each entry 86-88 may specify a version of the data stored on the track, as described in more detail elsewhere herein. A sub-element of an LSU, for example, a logical storage portion or track, may be referred to herein as a logical storage element (LSE).

FIG. 3B is a diagram illustrating an example of a table 72' used for a thin logical device (i.e., a thin LSU), which may include null pointers as well as entries similar to entries for the LSU table 72, discussed above, that point to a plurality of LSU track tables 82*a*-82*e*. Table 72' may be referred to herein as a "thin device table." A thin logical device may be allocated by the system to show a particular storage capacity while having a smaller amount of physical storage that is actually allocated. When a thin logical device is initialized, all (or at least most) of the entries in the thin device table 72' may be set to null. Physical data may be allocated for particular sections as data is written to the particular logical data portion. If no data is written to a logical data portion, the corresponding entry in the thin device table 72' for the data portion maintains the null pointer that was written at initialization.

FIG. 3C is a block diagram illustrating an example of a data structure 300 for mapping LSU tracks (e.g., thin device tracks) to cache slots of a cache. Data structure 300 may be referred to herein as a "cache slot table." Cache slot table 300 may include a plurality of entries (i.e., rows) 302, each row representing an LSU track (e.g., any of LSU tracks 86-88 in track table 82) identified by an LSU ID in column 304 and an LSU track ID (e.g., number) identified in column 306. For each entry of cache slot table 300, column 312 may specify a cache location in a cache corresponding to the logical storage device track specified by columns 304 and 306. A combination of an LSU identifier and LSU track identifier may be used to determine from columns 304 and 306 whether the data of the identified LSU track currently resides in any cache slot identified in column 312. Through use of information from any of tables 62, 72, 72' and 82 described in more detail elsewhere herein, the one or more LSU tracks of an LSU specified in an IO operation can be mapped to one or more cache slots. Further, using the same data structures, the one or more physical address ranges corresponding to the one or more LSU tracks of the LSU may be mapped to one or more cache slots.

Storage systems (e.g., the storage system 20*a*) also may maintain data structures (e.g., masking tables) that define IO connectivity in terms of LSUs, storage ports and host ports; i.e., which ports of a host system ("host ports"; e.g., SCSI initiators) are permitted to perform IO communications with which LSUs (e.g., identified with, and sometimes referred to as, a Logical Unit Numbers (LUNs)) over which ports of a storage system ("storage ports" e.g., SCSI targets). Defining (including initially defining and later modifying) which host ports are permitted to perform IO communications with which LSUs over which storage ports, for example, using a masking table or other data structure, may be referred to as configuring or defining IO connectivity between a host port, storage port and LSU, or more simply as "masking."

FIG. 3D is a block diagram illustrating an example of a data structure 350 defining port connectivity permissions between a storage system and one or more host systems, according to embodiments of the invention. Other embodiments of a data structure defining port connectivity permissions between a storage system and one or more host systems, for example, variations of data structure 350, are possible and are intended to fall within the scope of the invention. In some embodiments, data structure 350 may be a masking table. Data structure 350 may include a plurality of entries 360, each entry representing an LSU (e.g., logical device) identified in column 352 and specifying a host port (e.g., by World Wide Name (WWN)) in column 354 with which the identified LSU is enabled to communicate IO over the storage port identified in column 356. Other information, for example, the host and/or the HBA associated with the host port and/or the FA associated with the storage port may be specified in column 358. A data structure other than a table, for example, a linked list and/or object-oriented data structure, may be used to record the same information.

The tables 62, 72, 72', 82, 300 and 350 may be stored in the GM 26 of the storage system 20*a* during operation thereof and may otherwise be stored in non-volatile memory (i.e., with the corresponding physical storage device). In addition, tables corresponding to LSUs accessed by a particular host may be stored in local memory of the corresponding one of the FAs 21*a*-*n*. In addition, RA 40 and/or the BEs 23*a*-*n* may also use and locally store portions of the tables 62, 72, 72', 82, 300 and 350. Other data structures may be stored in any of GM 25*b*, memory 25*a*, GM segment 220*a*-*n* and/or dedicated local memories 22*a*-*n*.

Figure 4:
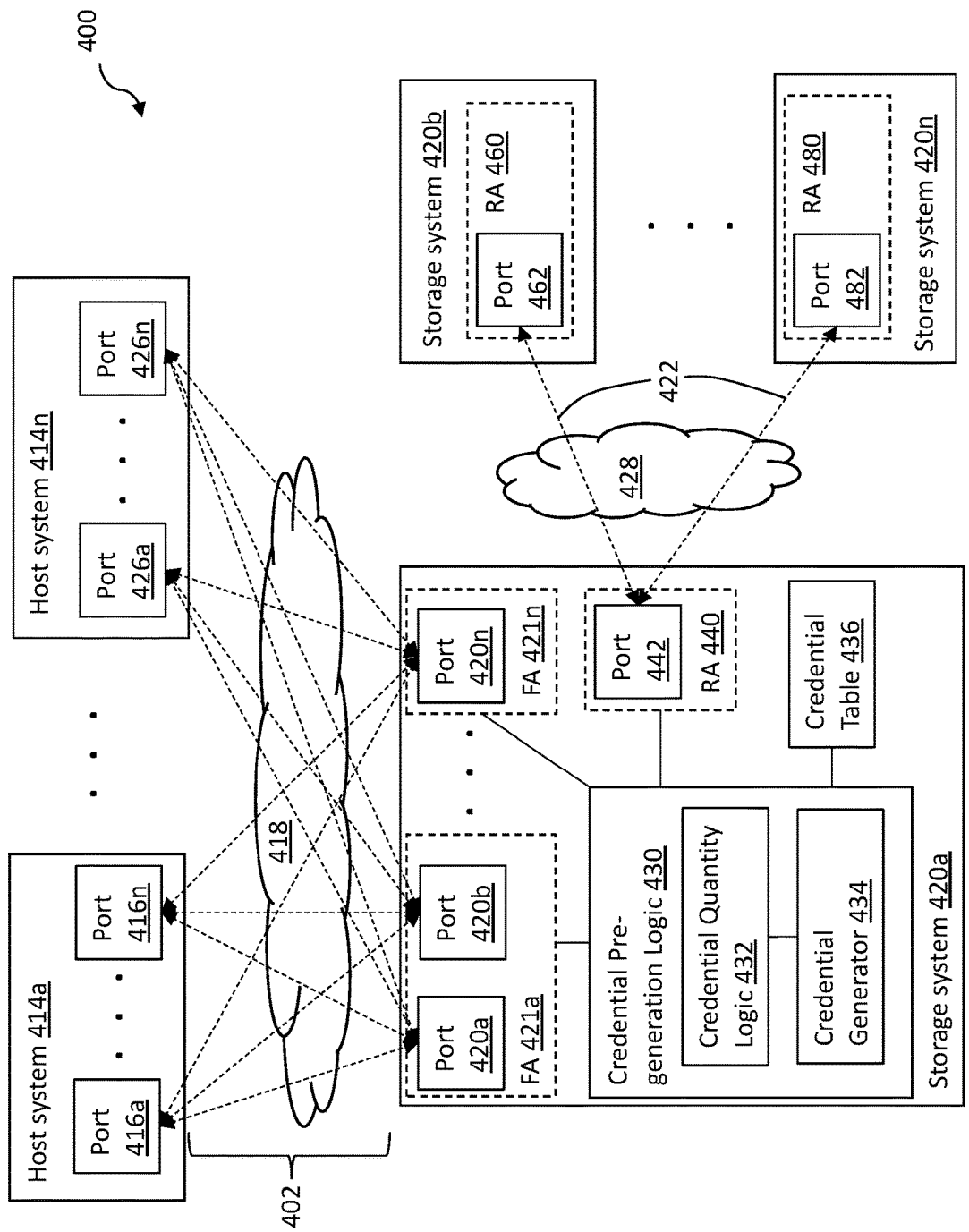
FIG. 4 is a block diagram illustrating a system for pre-generating security credentials before initiating establishment of a secure communication channel, according to embodiments of the invention.

FIG. 4 is a block diagram illustrating a system 400 for pre-generating security credentials before initiating establishment of a secure communication channel, according to embodiments of the invention. Other embodiments of a system for pre-generating security credentials before initiating establishment of a secure communication channel, for example, variations of the system 400, are possible and are intended to fall within the scope of the invention. The system 400 may be a variation of the storage network 10 described in relation to FIG. 1, and may include one or more components thereof and/or implement functionality provided thereby as described in more detail elsewhere herein.

The system 400 may include any of: host systems 414a-n, storage systems 420a-n, networks 418 and 428, and other components. Each of the networks 418 and 428 may be similar to or the same as the network 18 described in relations to FIG. 1, and in some embodiments the networks 418 and 428 may be part of a same network. The host system 414a may include a plurality of host ports 416a-n, where each host port may be part of a host bus adapter (HBA) or the like of the host system 414a. Host system 414n may include a plurality of host ports 426a-426n, where each host port may be part of an HBA or the like of the host system 414n. It should be appreciated that the number of ports included in each of the host systems 414a-n may be different than as illustrated in FIG. 4.

The storage system 420a may include a plurality or ports 420a-n, which also may be referred to herein as SSPs, for communication with host systems 414a-414n. Each of these ports may be part of an FA as described in more detail herein. For example, ports 420a and 420b may be part of an FA 421a, and port 420n may be part of FA 421a. Between each host port/SSP pair, a communication channel may be established, resulting (collectively) in potential communication channels 402. Whether and when an actual communication channel is established between a host port and an SSP may depend on any of a plurality of factors, including, but not necessarily limited to, whether: there is a physical coupling between the ports, including one or more cables and potentially a switch fabric; the ports are zoned for communication, i.e., whether a zoning table defined for a switch fabric (not shown) interposed between the ports permits communications between the ports; a masking table (or the like) on the storage system permits connectivity between the ports; and/or there is a failure of any of the links or other components between the ports.

The storage system also may include one or more ports, including port 442, configured for communication with ports of other storage systems, e.g., ports 462 and 482 of storage systems 420b and 420n, respectively. The port 442 and/or other ports of the storage system 420a may be part of an RA, for example, RA 440. Similarly, ports 462 and 482 may be part of RAs 460 and 480, respectively. Potential communication channels 422 exist between the port 442 and the ports 462 and 482. Also, although not shown in FIG. 4, a potential communication channel may exist between ports 462 and 482. While not shown in FIG. 4, each of the storage systems 420b and 420n may have any of the components illustrated as part of the storage system 420a. It should be appreciated that the number of ports, FAs, RAs, ports per FA and ports per RA may be different than as shown in FIG. 4.

The storage system 420a also may include credential pre-generation logic 430, which may be configured to perform aspects of the invention described herein in relation to pre-generating secure credentials (e.g., DH key pairs), including the method 500 described elsewhere herein. The credential pre-generation logic 430 may include credential quantity logic 432 to determine an initial number of secure credentials (e.g., DH key pairs) to generate, for example, based on a user-specified quantity and/or a potential quantity of communication channels for the storage system, as described in more detail elsewhere herein. The credential quantity logic 432 may provide this determined quantity to a credential generator 434, which may generate the initial credentials. The credential generator 434 may be configured to generate DH key pairs (e.g., using software developed using an OpenSSL toolkit), and populate a credential table 436 with the generated credentials. In some embodiments, the credential table 436 or a copy thereof may reside in persistent memory of the storage system so that the secure credentials are retained even after power is lost or turned off and/or code on the storage system is re-booted. Further, the credential table 436 or a copy thereof may be maintained in a secure, tamper-proof environment (e.g., in a secure lockbox) so that secure credentials cannot be accessed by unauthorized entities.

The credential quantity logic 432 also may be configured to monitor a number of unused credentials remaining in the credential table 436, as described in more detail elsewhere herein, and determine a quantity of secure credentials to generate for future use based on the number of unused credentials and estimated future need, as described in more detail elsewhere herein. The credential quantity logic may indicate this determined quantity to the credential generator 434 to generate the secure credentials. In some embodiments, the logic for determining an initial quantity of secure credentials, the logic for monitoring a number of remaining unused secure credentials in the credential table, and the logic for determining a quantity for future use based on the number of unused credentials may each be separate and discrete components. The credential pre-generation logic 430, and each component thereof, may be implemented in software, firmware or hardware, or any suitable combination thereof.

FIG. 5 is a flowchart illustrating a method 500 of pre-generating security credentials before initiating establishment of a secure communication channel, according to embodiments of the invention. Other embodiments of a method of pre-generating security credentials before initiating establishment of a secure communication channel, for example, variations of the method 500, are possible and are intended to fall within the scope of the invention.

In a step 502, an initial quantity of secure credentials (e.g., DH key pairs) to generate may be determined, for example, by the credential quantity logic 432. The initial quantity may be determined based on a potential number of communication channels that may be established between the storage system and other devices remotely connected to the storage system, including host systems, other storage systems, and perhaps other components (e.g., of a storage network). For example, the number of potential communication channels may be determined by application of Equation 2:

$$C_P = P_F * P_H + P_R * P_S,\qquad\text{Equation 2:}$$

where $C_P$ is the potential number of communication channels; $P_F$ is the number of front-end ports of the storage system in total or that are known, or expected, to be connected (e.g., via zoning and masking) to port hosts; $P_H$ is the number of host ports that are coupled (e.g., via a switch fabric) to the front-end ports of the storage system in total or that are known, or expected, to be connected (e.g., via zoning and masking) to front-end hosts; $P_R$ is the number of ports of the storage system coupled to other storage systems (e.g., via an RA of the storage system) in total or that are known, or expected, to be connected to other storage systems; and $P_S$ is the number of ports of other storage systems coupled to ports of the storage system in total or that are known, or expected, to be connected to the storage system. In some embodiments, a factor may be applied to the determined number of potential communication channels, where the factor takes into account an estimated failure rate of communication channels, e.g., as a result of software error or hardware failure (e.g., a faulty component or an unplugged cable). Thus, the factor may be applied to increase the determined quantity of secure credentials to account for the estimated failure rate.

In some embodiments, the initial quantity of secure credentials to generate may be determined based on user input. For example, a user may specify the quantity of secure credentials (e.g., DH key pairs) to generate. In some embodiments, the quantity of secure credentials to create may be based on a combination of a generated number and user input, for example, a maximum of: a quantity specified by a user; and the determined potential number of communication channels (perhaps with a factor applied as described above).

In a step 504, the secure credentials (e.g., DH pairs) may be generated, for example, by credential generator 434. It should be appreciated that multiple secure credentials may be generated concurrently, for example, using multiple different physical or software components, which may be part of, or invoked by, the credential generator 434. In a step 505, the generated credentials may be stored, for example, in the credential table 436, e.g., in a secure and persistent manner as described in more detail herein.

In a step 506, the quantity of unused credentials may be monitored, for example, by examining remaining entries of the credential table (if used entries are removed) or entries in the credential table currently not marked as being used (or marked as being unused), and in the step 503, the quantity of credentials to generate may be determined. The step 503 may include taking into consideration a rate at which secure credentials are consumed or anticipated to be consumed (e.g., based on application of a predication algorithm). The loop formed by the steps 506, 503, 504 and 507 may be performed concurrently to performance of the steps 507-512. The steps 506, 503, 504 and 507 may be performed as part of a background thread, and may not be performed continuously, but rather at scheduled times, periodically or in response to an event (e.g., user input).

In a step 507, a request may be received to establish a communication channel between an SSP and a remote port, for example, from a user of the storage system, a host, another storage system or another component (e.g., management component) of the storage network. In a step 508, one or more pre-generated secure credentials (e.g., a DH key pair) may be allocated, for example, from an entry of the credential table 436. Further, the contents of the entry may be removed from the table or the entry may be marked as used. The step 507 may be performed as part of an IKE session to establish the secure communication channel, the remainder of which may be performed in a step 510. Executing the IKE session may include applying an allocated DH key pair to derive symmetric keys to be used to implement secure communications over the secure communication channel, for example, using EDiF. For example, the derived symmetric keys may be programmed into hardware of the SSP to perform EDiF on communications communicated over the secure communication channel.

In a step 512, communications may be exchanged over the established secure communication channel, for example, using EDiF employing the symmetric keys derived from the allocated pre-generated secure credentials (e.g., DH key pair). In some embodiments, the SSP is configured such that the same secure credentials are used for all communications with the remote port for which they were obtained, regardless of the I/O path used between the SSP and the remote port, and regardless of the LSU and/or application for which communications are being exchanged.

It should be appreciated that steps 507-510 may be performed concurrently for multiple different communication channels, and that each performance of the steps 507-510 for a given communication channel may be performed concurrently to the performance of the step 512 for one or more other communication channels.

Various embodiments of the invention may be combined with each other in appropriate combinations. Additionally, in some instances, the order of steps in the flowcharts, flow diagrams and/or described flow processing may be modified, where appropriate. It should be appreciated that any of the methods described herein, including method 500, or parts thereof, may be implemented using one or more of the systems and/or data structures described in relation to FIGS. 1-4, or components thereof. Further, various aspects of the invention may be implemented using software, firmware, hardware, any suitable combination thereof and/or other computer-implemented modules or devices having the described features and performing the described functions. Logic that when executed performs methods described herein, steps thereof or portions of such methods or steps, may be implemented as software, firmware, hardware, any suitable combination thereof.

Software implementations of embodiments of the invention may include executable code that is stored one or more computer-readable media and executed by one or more processors. Each of the computer-readable media may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer-readable medium or computer memory on which executable code may be stored and executed by a processor. Embodiments of the invention may be used in connection with any appropriate OS.

As used herein, an element or operation recited in the singular and preceded with the word "a" or "an" should be understood as not excluding plural elements or operations, unless such exclusion is explicitly recited. References to "one" embodiment or implementation of the present disclosure are not intended to be interpreted as excluding the existence of additional embodiments that also incorporate the recited features. Furthermore, a description or recitation in the general form of "at least one of [a], [b] or [c]," or equivalent thereof, should be generally construed to include [a] alone, [b] alone, [c] alone, or any combination of [a], [b] and [c]. In addition, use of a an ordinal term, e.g., "first," "second" or the like, to qualify a term for an item having multiple instances of the same name does not necessarily indicated a priority, precedence or temporal order between the instances unless otherwise indicated, but rather such ordinal terms may be used merely to distinguish between the separate instances.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method comprising:
generating, by a storage system, a plurality of secure credentials having an initial quantity of secure credentials, wherein the initial quantity is a maximum of a first user-specified quantity and a second quantity based on a potential number of communication channels potentially established between the storage system and other remote entities connected to the storage system, wherein said generating the plurality of secure credentials further includes:
determining the potential number of communication channels based on a first number of front-end ports of the storage system connected to host ports of host systems, based on a second number of host ports connected to front-end ports of the storage system, based on a third number of storage system ports connected to other storage systems, and based on a fourth number of ports of other storage systems connected to ports of the storage system, wherein said determining the potential number of communication channels further includes:
adding a third quantity and a fourth quantity, wherein the third quantity is determined by multiplying the first number by the second number, and wherein the fourth quantity is determined by multiplying the third number by the fourth number, wherein a first potential number of communication channels is determined as a result of said adding the third quantity and the fourth quantity, and wherein the second quantity is based on a factor applied to the first potential number of communication channels to increase the first potential number of communication channels, wherein the factor takes into account an estimate failure rate of communication channels as a result of software error or hardware error;
storing the plurality of secure credentials in a list of secure credentials available for allocation, wherein the plurality of secure credentials includes first secure credentials;
receiving, at the storage system from an other system subsequent to said generating and subsequent to said storing, a request to establish a first communication channel between the storage system and the other system, wherein the storage system and the other system are coupled by one or more communication media over which communication channels are established;
responsive to said receiving the request, obtaining, at the storage system, the first secure credentials that a regenerated by the storage system prior to the request being received, wherein said obtaining the first secure credentials includes:
allocating the first secure credentials from the list of secure credentials available for use, wherein each of the secure credentials in the list is generated by the storage system prior to receiving the request at the storage system; and
responsive to said allocating the first secure credentials from the list for use in connection with establishing the first communication channel, removing the first secure credentials from the list of secure credentials available for use, wherein each secure credential on the list of secure credentials available for use has not been allocated for use in establishing a communication channel with the storage system, and wherein said each secure credential on the list is currently available for allocation to an additional requesting system responsive to the storage system receiving a subsequent request from the additional requesting system to establish a communication channel between the storage system and the additional requesting system;
establishing a secure communication channel as the requested first communication channel between the storage system and the other system, wherein said establishing includes the storage system applying the first secure credentials to derive symmetric keys;
the storage system securely exchanging communications with the other system over the established secure communication channel using the derived symmetric keys to encrypt data of the securely exchanged communications;
monitoring a current quantity of secure credentials in said list of secure credentials available for use; and
responsive to said monitoring, determining a first quantity of additional secure credentials to generate and add to said list of secure credentials available for use, wherein said first quantity replenishes used secure credentials which have been allocated and removed from the list.

2. The method of claim 1, wherein the first secure credentials are a pair of asymmetric keys in accordance with a public cryptography protocol.

3. The method of claim 1, wherein said generating the plurality of secure credentials for the storage system is performed independently of establishing communication channels with other systems.

4. The method of claim 3, further comprising:
maintaining the list of the plurality of secure credentials.

5. The method of claim 3, further comprising:
generating additional secure credentials to replenish used secure credentials allocated from said list in response to additional systems being coupled to the storage system.

6. The method of claim 1, wherein the derived symmetric keys are programmed into hardware of the storage system to perform encryption on communications communicated over the established secure communication channel.

7. The method of claim 1, wherein the other system is one of: a host, another storage system, another system of a storage network which includes the storage system, and a management component.

8. A storage system coupled to an other system by one or more communication media used to establish communication channels between the storage system and the other system, the storage system including executable logic that implements a method including:
generating, by a storage system, a plurality of secure credentials having an initial quantity of secure credentials, wherein the initial quantity is a maximum of a first user-specified quantity and a second quantity based on a potential number of communication channels potentially established between the storage system and other remote entities connected to the storage system, wherein said generating the plurality of secure credentials further includes:
determining the potential number of communication channels based on a first number of front-end ports of the storage system connected to host ports of host systems, based on a second number of host ports connected to front-end ports of the storage system, based on a third number of storage system ports connected to other storage systems, and based on a fourth number of ports of other storage systems connected to ports of the storage system, wherein said determining the potential number of communication channels further includes:
  adding a third quantity and a fourth quantity, wherein the third quantity is determined by multiplying the first number by the second number, and wherein the fourth quantity is determined by multiplying the third number by the fourth number, wherein a first potential number of communication channels is determined as a result of said adding the third quantity and the fourth quantity, and wherein the second quantity is based on a factor applied to the first potential number of communication channels to increase the first potential number of communication channels, wherein the factor takes into account an estimate failure rate of communication channels as a result of software error or hardware error;
storing the plurality of secure credentials in a list of secure credentials available for allocation, wherein the plurality of secure credentials includes first secure credentials;
receiving, at the storage system from an other system subsequent to said generating and subsequent to said storing, a request to establish a first communication channel between the storage system and the other system, wherein the storage system and the other system are coupled by one or more communication media over which communication channels are established;
responsive to said receiving the request, obtaining, at the storage system, the first secure credentials that are generated by the storage system prior to the request being received, wherein said obtaining the first secure credentials includes:
  allocating the first secure credentials from the list of secure credentials available for use, wherein each of the secure credentials in the list is generated by the storage system prior to receiving the request at the storage system; and
  responsive to said allocating the first secure credentials from the list for use in connection with establishing the first communication channel, removing the first secure credentials from the list of secure credentials available for use, wherein each secure credential on the list of secure credentials available for use has not been allocated for use in establishing a communication channel with the storage system, and wherein said each secure credential on the list is currently available for allocation to an additional requesting system responsive to the storage system receiving a subsequent request from the additional requesting system to establish a communication channel between the storage system and the additional requesting system;
establishing a secure communication channel as the requested first communication channel between the storage system and the other system, wherein said establishing includes the storage system applying the first secure credentials to derive symmetric keys;
the storage system securely exchanging communications with the other system over the established secure communication channel using the derived symmetric keys to encrypt data of the securely exchanged communications;
monitoring a current quantity of secure credentials in said list of secure credentials available for use; and
responsive to said monitoring, determining a first quantity of additional secure credentials to generate and add to said list of secure credentials available for use, wherein said first quantity replenishes used secure credentials which have been allocated and removed from the list.

9. The storage system of claim 8, wherein the first secure credentials are a pair of asymmetric keys in accordance with a public cryptography protocol.

10. The storage system of claim 8, wherein said generating the plurality of secure credentials for the storage system is performed independently of establishing communication channels with other systems.

11. The storage system of claim 10, wherein the method further includes:
  maintaining the list of the plurality of secure credentials.

12. The storage system of claim 10, wherein the method further includes:
  generating additional secure credentials to replenish used secure credentials allocated from said list in response to additional systems being coupled to the storage system.

13. A non-transitory computer-readable media having software stored thereon comprising:
  executable code that generates, by a storage system, a plurality of secure credentials having an initial quantity of secure credentials, wherein the initial quantity is a maximum of a first user-specified quantity and a second quantity based on a potential number of communication channels potentially established between the storage system and other remote entities connected to the storage system, wherein said executable code that generates the plurality of secure credentials further includes:
    executable code that determines the potential number of communication channels based on a first number of front-end ports of the storage system connected to host ports of host systems, based on a second number of host ports connected to front-end ports of the storage system, based on a third number of storage system ports connected to other storage systems, and based on a fourth number of ports of other storage systems connected to ports of the storage system, wherein said executable code that determines the potential number of communication channels further includes:
      executable code that adds a third quantity and a fourth quantity, wherein the third quantity is determined by multiplying the first number by the second number, and wherein the fourth quantity is determined by multiplying the third number by the fourth number, wherein a first potential number of communication channels is determined as a result of adding the third quantity and the fourth quantity, and wherein the second quantity is based on a factor applied to the first potential number of communication channels to increase the first potential number of communication channels, wherein the factor takes into account an estimate failure rate of communication channels as a result of software error or hardware error;
  executable code that stores the plurality of secure credentials in a list of secure credentials available for allocation, wherein the plurality of secure credentials includes first secure credentials;
  receiving, at the storage system from an other system subsequent to said generating and subsequent to said storing, a request to establish a first communication channel between the storage system and the other system, wherein the storage system and the other system are coupled by one or more communication media over which communication channels are established;

executable code that receives, at the storage system from an other system subsequent to generating the plurality of secure credential and subsequent to storing the plurality of secure credentials, a request to establish a communication channel between the storage system and the other system, wherein the storage system and the other system are coupled by one or more communication media over which communication channels are established;

executable code that, responsive to receiving the request, obtains, at the storage system, first secure credentials that are generated by the storage system prior to the request being received, wherein said executable code that obtains the first secure credentials further includes:

executable code that allocates the first secure credentials from the list of secure credentials available for use, wherein each of the secure credentials in the list is generated by the storage system prior to receiving the request at the storage system; and executable code that, responsive to allocating the first secure credentials from the list for use in connection with establishing the first communication channel, removes the first secure credentials from the list of secure credentials available for use, wherein each secure credential on the list of secure credentials available for use has not been allocated for use in establishing a communication channel with the storage system, and wherein said each secure credential on the list is currently available for allocation to an additional requesting system responsive to the storage system receiving a subsequent request from the additional requesting system to establish a communication channel between the storage system and the additional requesting system;

executable code that establishes a secure communication channel as the requested first communication channel between the storage system and the other system, wherein establishing the secure communication channel between the storage system and the other system further includes executable code that, at the storage system, applies the first secure credentials to derive symmetric keys;

executable code that allows the storage system to securely exchange communications with the other system over the established secure communication channel using the derived symmetric keys to encrypt data of the securely exchanged communications;

executable code that monitors a current quantity of secure credentials in said list of secure credentials available for use; and executable code that, responsive to monitoring the current quantity of secure credentials in said list, determines a first quantity of additional secure credentials to generate and add to said list of secure credentials available for use, wherein said first quantity replenishes used secure credentials which have been allocated and removed from the list.

14. The non-transitory computer-readable media of claim 13, wherein the first secure credentials are a pair of asymmetric keys in accordance with a public cryptography protocol.

15. The non-transitory computer-readable media of claim 13, wherein the executable code that, generates the plurality of secure credentials for the storage system, generates the plurality of secure credentials independently of establishing communication channels with other systems.

16. The non-transitory computer-readable media of claim 15, wherein the software further comprises:

executable code that maintains the list of the plurality of secure credentials.

* * * * *